United States Patent [19]

Susini et al.

[11] Patent Number: 4,946,432
[45] Date of Patent: Aug. 7, 1990

[54] DEVICE FOR SEALING AND PERFORATING A THERMOPLASTIC FILM

[75] Inventors: Etienne Susini, Villecresnes, France; Pierre Soubrier, Brussels, Belgium

[73] Assignee: Baxter International Inc., Deerfield, Ill.

[21] Appl. No.: 330,993

[22] Filed: Mar. 28, 1989

Related U.S. Application Data

[63] Continuation of Ser. No. 155,923, filed as PCT FR87/00174 on May 20, 1987, published as WO87/07212 on Dec. 3, 1987, abandoned.

[30] Foreign Application Priority Data

May 21, 1986 [FR] France ................ 86 07210

[51] Int. Cl.⁵ .......................................... B65B 61/00
[52] U.S. Cl. ............................ 493/341; 156/515; 156/553; 156/583.7; 219/243; 493/194; 493/209
[58] Field of Search ................ 493/203; 219/243

[56] References Cited

U.S. PATENT DOCUMENTS

| | | |
|---|---|---|
| 2,146,308 | 2/1939 | Maxfield . |
| 2,606,987 | 8/1952 | Winstead ........................ 201/64 |
| 2,661,741 | 12/1953 | Puckman . |
| 3,183,750 | 5/1965 | Davis . |
| 3,272,424 | 9/1966 | Rodkey . |
| 3,299,603 | 1/1967 | Shaw . |
| 3,367,261 | 2/1968 | Kashiwagi ........................ 100/93 |
| 3,380,646 | 4/1968 | Doyen et al. . |
| 3,538,669 | 11/1970 | Broman et al. . |
| 3,583,460 | 6/1971 | Faust . |
| 3,659,777 | 5/1972 | Kanada et al. . |
| 3,720,141 | 3/1973 | Stock . |
| 3,940,305 | 2/1976 | Stenberg ........................ 493/203 |
| 3,982,991 | 9/1976 | Hamm . |
| 4,010,768 | 3/1977 | Aguattant . |
| 4,081,658 | 3/1978 | Ammann ........................ 219/243 |
| 4,306,400 | 12/1981 | Coleman et al. . |
| 4,332,327 | 6/1982 | Frohwerk et al. . |
| 4,649,259 | 3/1987 | Zurn ........................ 219/243 |

FOREIGN PATENT DOCUMENTS

| | | |
|---|---|---|
| 1673783 | 10/1959 | Fed. Rep. of Germany . |
| 1511036 | 10/1969 | Fed. Rep. of Germany . |
| 2115161 | 10/1971 | Fed. Rep. of Germany . |
| 3102192A1 | 9/1982 | Fed. Rep. of Germany . |
| 3149809A1 | 7/1983 | Fed. Rep. of Germany . |
| 895084 | 1/1945 | France . |
| 2076245 | 10/1971 | France . |
| 2291010 | 6/1976 | France . |
| 2359759 | 2/1978 | France . |
| 2394461 | 1/1979 | France . |
| 2460849 | 1/1981 | France . |
| 2480243 | 10/1981 | France . |
| 2528801 | 12/1983 | France . |
| 1556619 | 11/1979 | United Kingdom . |
| 2027407 | 1/1983 | United Kingdom . |
| 2054451 | 12/1983 | United Kingdom . |
| 2125760 | 6/1986 | United Kingdom . |

Primary Examiner—Frederick R. Schmidt
Assistant Examiner—Jack Lavinder
Attorney, Agent, or Firm—Paul E. Schaafsma; Paul C. Flattery

[57] ABSTRACT

The invention consists of a device for welding and perforating a thermoplastic film folded back on itself. The device consists of a support for supporting two electrically heated welding strips and a perforation device. The perforation device is movably supported between the welding strips. The support is transversely movable with respect to the film. The welding strips consists of a non-heating portion and a heating portion. The non-heating portion is at least equal in length to the heating portion.

11 Claims, 3 Drawing Sheets

FIG. 2
FIG. 3
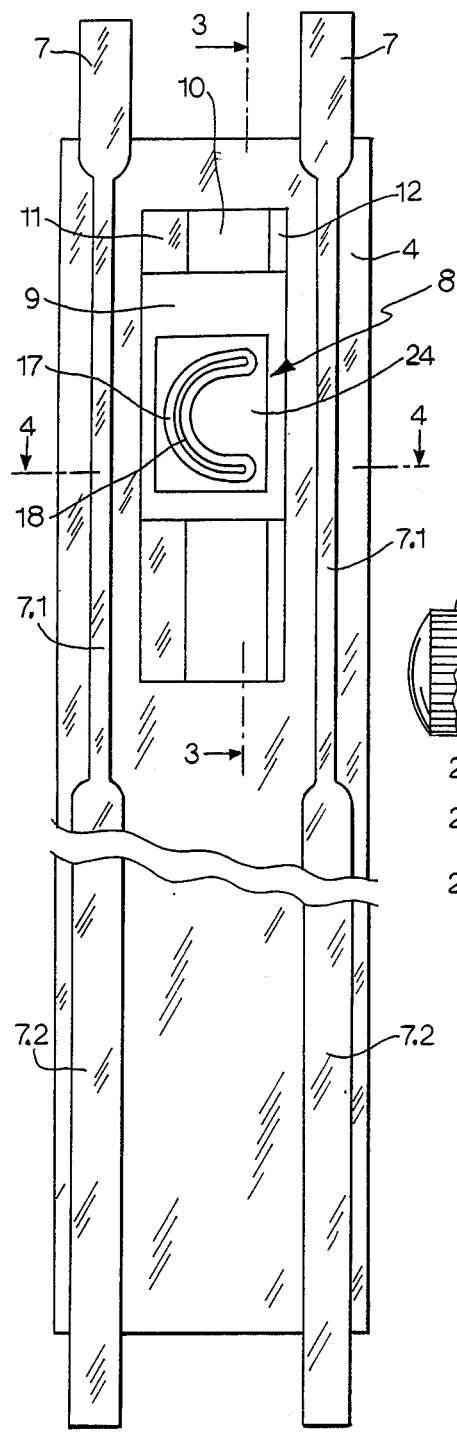
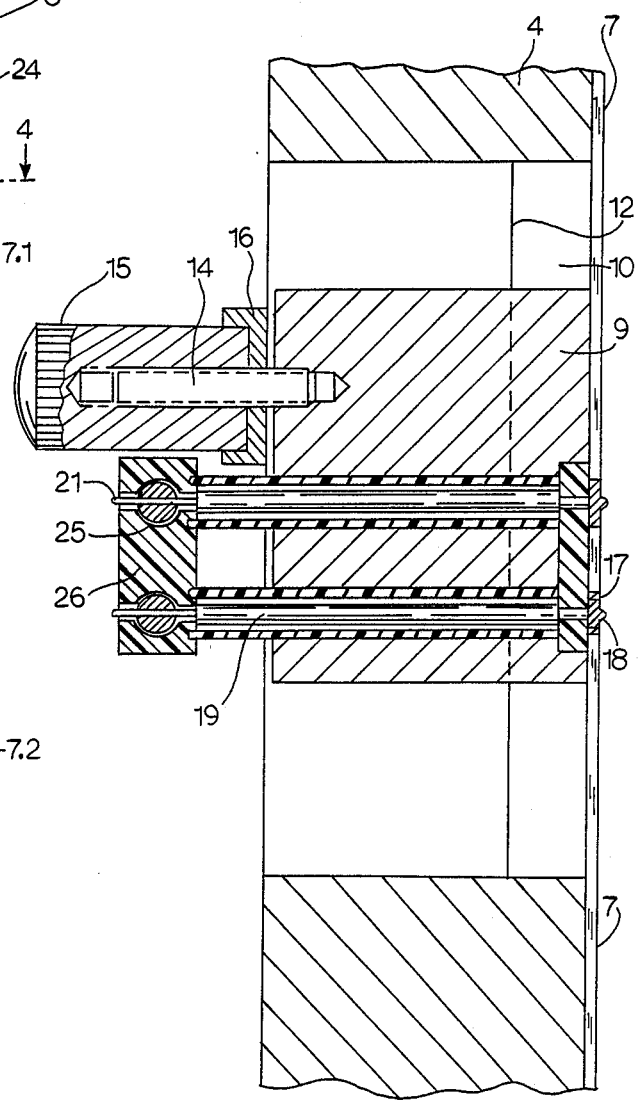

DEVICE FOR SEALING AND PERFORATING A THERMOPLASTIC FILM

This application is a continuation of application Ser. No. 07/155,923, filed as PCT FR87/00174 on May 20, 1987, published as WO87/07212 on Dec. 3, 1987, now abandoned.

BACKGROUND OF THE INVENTION

The present invention relates generally to a device for sealing and perforating a thermoplastic film folded back on itself. The invention specifically relates, but not exclusively so, to the manufacture of perfusion pouches or bags.

Machines for the manufacture of pouches from a flexible film of plastic material are known. Particularly, there are known machines for the manufacture of pouches from a thermoplastic film. These machines include a series of stations at which the film is treated in succession. Generally, the film is unwound from a winding device, then it is perforated. Perpendicular to the perforations, ports or fitments are heat sealed by a welding head then the film is shaped in a shaping device principally designed to fold the film back on itself in order to create an edge to edge heat seal. The film thus sealed edge to edge forms a tube that is then sealed in the transverse direction at regular intervals, to create individual pouches or bags. These individual pouches are then filled prior to the sealing of the pouch or bag.

A present invention more particularly relates to a device designed to create the edge to edge heat sealing of the film folded back on itself.

Devices are known that permit the creation of a seal parallel to the edge, or even two seals parallel to the edge and spaced from each other, in order to form a small protruding edge inside which a perforation can be made to create an opening to hang the pouch. The seal or seals generally are created by use of a sealing strip that comprises a heating portion. The film so sealed, is allowed to cool naturally at the exit of the sealing station. Such a structure presents several drawbacks, especially in machines working at high speeds, wherein the sealing strips must be brought to a high temperature in order to create a rapid sealing. Indeed in such machines, there exists a risk that the stresses exerted on the film as it exits the sealing station will cause a separation, at least partial, of the associated film portions, so that the seal no longer is secure or is too fragile.

SUMMARY OF THE INVENTION

The present invention provides a device for sealing and perforating a thermoplastic film folded back on itself, that permits the manufacture of an improved pouch, that overcomes some of the afore-mentioned disadvantages of the prior art.

To this end, there is provided, according to the present invention, a device for sealing anud perforating a thermoplastic film folded back on itself, driven step by step, that includes a support movable in a direction transverse to the film and heating means carried by the support. The heating means includes two sealing strips that conduct electricity, and are spaced from each other. Each sealing strip includes a portion heated by the passage of an electric current. The device also includes perforating means located between the sealing strips. The sealing strips include a non-heating portion the length of which is at least equal to the heating portion, and is located downstream from the heating portion in the direction of movement of the film.

Thus as the film moves step by step, the seals at the edges of the film are first created by the heating portion of the sealing strips, then cooled and flattened by the non-heating portion of the sealing strips. This prevents a later deformation of the sealed film.

In an embodiment of the present invention, the perforating means is mounted on a base which is movable in a direction parallel to a longitudinal direction of the sealing strips. In that way, the position of the hanging opening can be adjusted at will. In particular, when the machine is used to manufacture pouches of different widths, it is possible to position the perforating means so that the hanging opening will systematically fall in the middle of the pouch's width.

In another embodiment of the present invention, the perforating strip comprises folded back ends received in a first end of tubular connecting rods and welded to the latter, the tubular connecting rods having a second end equipped with a welded insert. In this manner, there is ensured a good connection, mechanical as well as electrical, between the perforation strip and the connecting rods which feed electric current to the perforation strip.

Other features and advantages of the invention will be apparent from the detailed description of a presently preferred embodiments of the invention, taken together with the attached drawings.

BRIEF DESCRIPTION OF THE DRAWINGS

FIG. 2 is an elevated view, with parts broken away, of the sealing and perforating device of the invention.

FIG. 3 is a partial section view along line III—III of FIG. 2.

DETAILED DESCRIPTION OF THE PRESENTLY PREFERRED EMBODIMENTS

Figure 1:
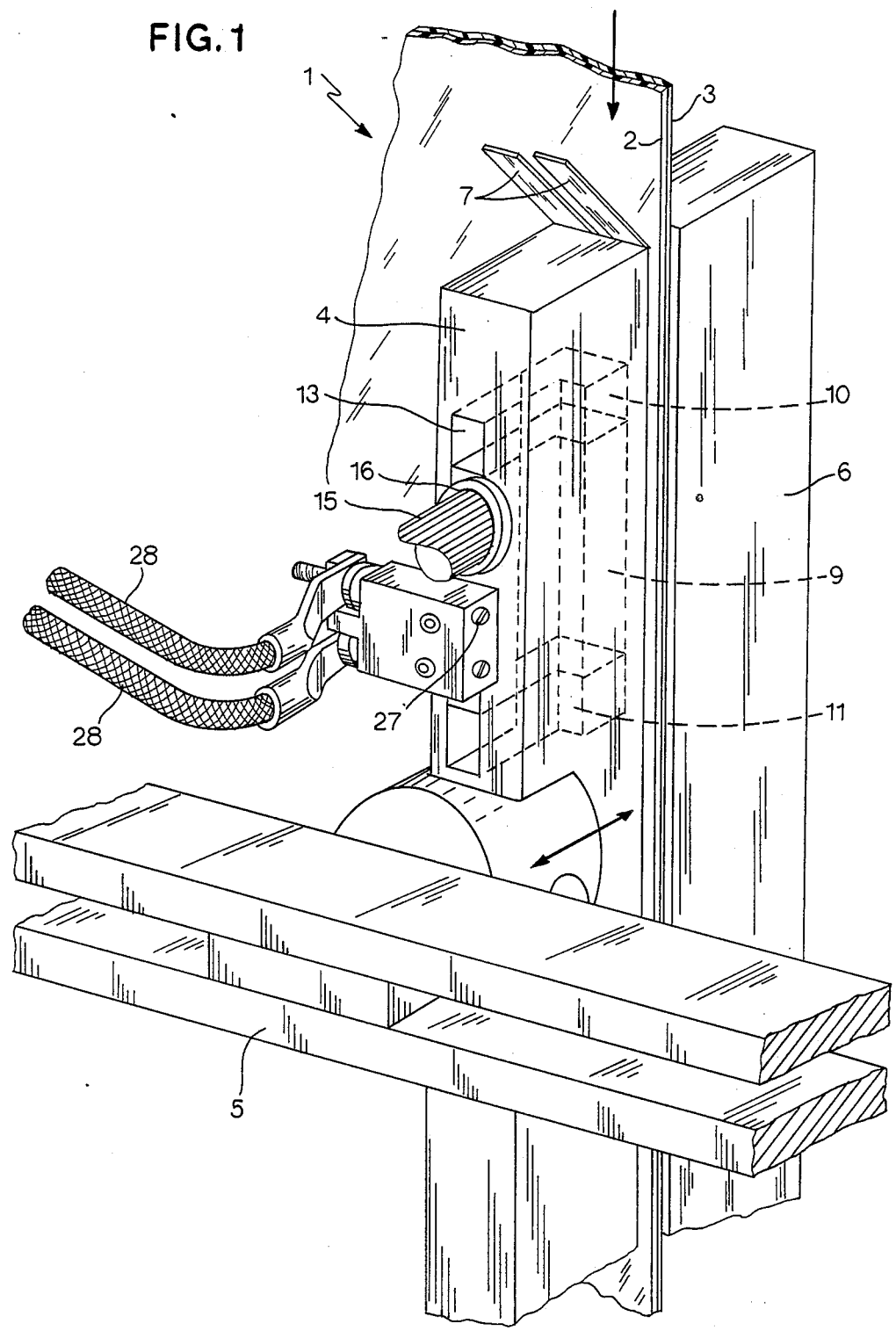
FIG. 1 is a perspective view of the sealing and perforating device, positioned facing a film of the present invention.
Figure 4:
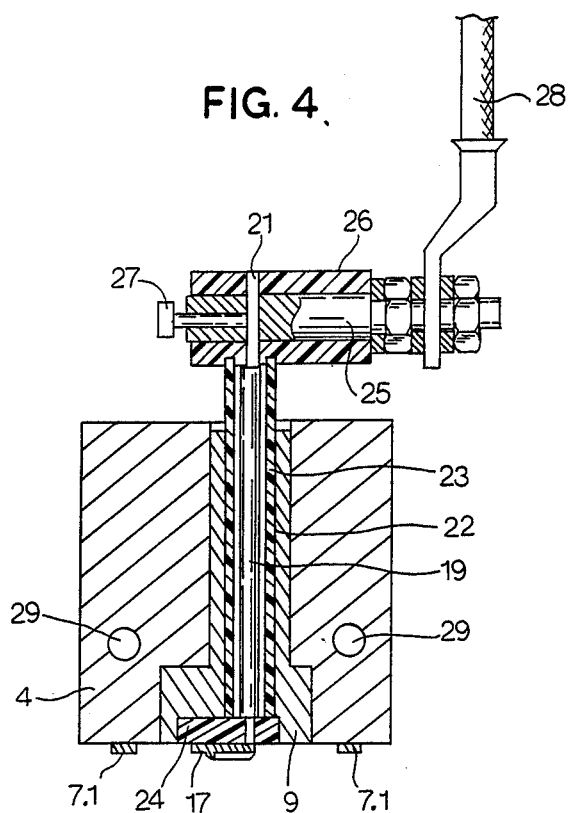
FIG. 4 is a section view along line IV—IV of FIG. 2.
Figure 6:
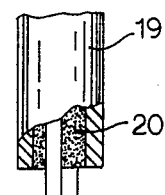
FIG. 6 is an enlarged section view along line VI—VI of FIG. 5.
Figure 5:
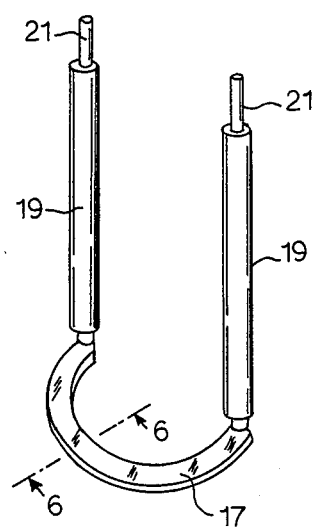
FIG. 5 is an enlarged perspective view of the perforating strip.

Referring now to the Figures, the device according to the present invention is constructed so that it ensures the edge to edge sealing and perforation of a thermoplastic film 1 folded back on itself and having two layers 2 and 3. The device comprises a support 4 movable in a direction transverse to the film 1. Movement of the support is affected by an operating rod 5 which itself is connected to operating means (not illustrated), which can include, a pneumatic jack. Preferably, the device also comprises a counterplate 6 located facing the movable support 4 and serving as a support for the film 1 when the movable support 4 is applied against the film 1 by the operating rod 5. The movable support 4 includes, on a surface facing the film, heating means defined by two electricity conducting sealing strips 7, spaced apart from each other. Each sealing strip includes a section having a narrowed width 7.1 which has an electrical resistance sufficient to for a heating part by passage of an electric current. Downstream from the heating parts 7.1, in the direction of the movement of the thermoplastic film 1, each sealing strip 7 comprises a non-heating portion 7.2, for example a portion of the strip, the width which is sufficient so that the portion has a low electric resistance and the length of which is at least equal to the heating portion 7.1. The heating strips 7 are located on the face of the movable support 4 that is turned toward the thermoplastic film 1. The heating strips 7 extend beyond the ends of the movable support in order to make possible their connection to a source of electricity (not illustrated).

Perforating means generally designated by the numeral 8 is carried by the movable support 4, between the heating parts 7.1 of the sealing strips 7.

In the preferred embodiment of the invention illustrated, the perforating means 8 is mounted on a base 9 which is movable in a direction parallel to the longitudinal direction of the sealing strips 7. More specifically, the movable base 9 is located in an opening 10 created between the sealing strips 7 and having shoulders 11 and 12 on which there rest corresponding shoulders of the movable base 9. At the rear part of the movable support 4, the opening 10 opens along a slit 13 inside of which there runs a threaded rod 14 received at one of its ends in the movable base 9, and the other end of which is connected to a milled knob 15 that is supported on the edges of slit 13 by means of a washer 16 constructed from plastic material. Thus, when the milled knob 15 is tightened, the movable base 9 is blocked against the shoulders 11 and 12; when the milled knob 15 is loosened, however, the movable base 9 is free to move inside opening 10 in a direction parallel to the sealing strips 7.

The perforating means includes a perforating strip 17 which is heated by the passage of an electric current and includes a longitudinal rib 18 turned toward the film. Preferably, the perforation strip 17 is a profiled strip curved in the form of a C, and the ends of which are folded back in a direction perpendicular to the plane of the strip and coupled with a first end of tubular connecting rods 19 to which they are welded by a welding 20. The second end of each connecting rod 19 is equipped with an insert 21 welded in the connecting rod.

In order to receive the perforating means, the base 9 includes borings 22 in which are located electrically insulating tubes 23. When the connecting rods 19 are received within the insulating tubes 23, the perforating strip rests against an electrically and thermally insulating plate 24 inserted in the front face of the movable base 9.

The inserts 21 located at the ends of the connecting rods 19 are secured in sockets 25, themselves placed inside an insulating block 26, by means of blocking screws 27. The sockets 25 are connected in a conventional manner to current feeding cables 28.

In order to prevent an overheating of the sealing and perforating head, ducts 29 are advantageously provided in the movable support 4. The ducts 29 are connected to a source of cooling fluid.

Figure 7:
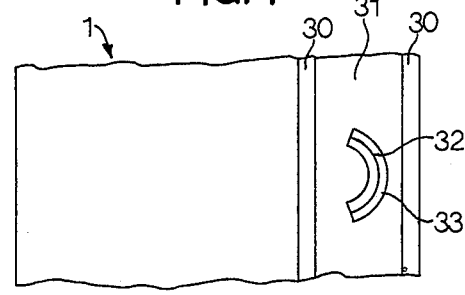
FIG. 7 is a plan view of the film as it exits the sealing and perforating device of the present invention.

The device according to the present invention functions as follows: the film 1 is advanced forward step by step between the movable support 4 and the counterplate 6. At each stop of the film, the movable support is moved forward toward the film and an electric current is sent into the sealing strips 7 and into the perforating strip 17. At the position of the perforating strip 17, the lateral portions of strip 17 seal the film while the rib 18 perforates the two layers of the film. After the film 1 has advanced forward one step, following the sealing and perforation, it is again contacted by the movable support 4, this time by the cooler portions 7.2 of the sealing strip 7. During this step the seals, which are still hot, are crushed down while they are cooled, so that at the exit of the device the film comprises two flat seals 30 (FIG. 7) that surround a small protruding outer edge 31 in which there is formed a curvilinear slit 32 in the form of a basket handle which is itself surrounded by a seal 33. It is therefore apparent that when the film 1 is sealed in the transverse direction, during a later step in the process, the protruding outer edge 31 will be entirely sealed on its edges and therefore will not permit the accumulation of contaminants during the various manipulations.

Of course, the invention is not limited to the embodiment which has been described above, and it is subject to variations in practice that will be apparent to those skilled in the art. Specifically, the perforating strip 17 may be made in the form of a circular ring so as to obtain an opening of the same shape in the protruding outer edge, the connecting rods, in that case, being welded in a direction perpendicular to the rear surface of the circular ring.

It is also possible to provide for the remote control modification of the movable base 9, so as to avoid an intervention at the level of the sealing and perforating device.

We claim:

1. A sealing and perforating device for a thermoplastic film folded back on itself, and driven step by step, comprising a support movable in a direction transverse to that of the film, and heating means carried by the movable support, the heating means including two sealing strips that conduct electricity, spaced apart from each other and each including a portion heated by the passage of an electric current, and the support further including perforating means located between the sealing strips, the sealing strips including a non-heating portion the length of which is at least equal to the heating portion, the non-heating portion being located downstream from the heating portion relative to the direction of movement of the film, the movable support urging the heating means and the perforating means into contact with the film.

2. The sealing and perforating device of claim 1 wherein the perforating means is mounted on a base that is movable in a direction parallel to a longitudinal direction of the sealing strips.

3. The sealing and perforating device of claim 1 wherein the perforating means comprises a perforating strip that is heated by the passage of an electric current and has a longitudinal rib turned toward the film.

4. The sealing and perforating device of claim 1 wherein the perforating means has a profile that is in the form of a C and is so constructed and arranged that it creates a slit in the film having a shape that is substantially similar to that of a basket handle.

5. A sealing and perforating device for a thermoplastic film folded back on itself, and driven step by step, comprising a support movable in a direction transverse to that of the film, and heating means carried by the movable support, the heating means including two sealing strips that conduct electricity, spaced apart from each other and each including a portion heated by the passage of an electric current, and the support further including perforating means located between the sealing strips, the perforating means including a perforating strip that is heated by the passage of an electric current and has a longitudinal rib turned toward the film, the sealing strips including a non-heating portion the length of which is at least equal to the heating portion, the non-heating portion being located downstream from the heating portion relative to the direction of movement of the film, the perforating strip includes folded back ends received in a first end of tubular connecting rods and welded thereto, the tubular connecting rods including a second end having a welded insert.

6. An apparatus for sealing and perforating a film comprising:
   a movable support;
   heating means secured to the movable support including two sealing strips spaced from each other, each sealing strip including a heat producing portion, the movable support urging the heat producing portions into contact with the film such that the heat from the heating producing portions seals a portion of the film, and a non-heating portion having a length which is at least as great as the length of the heat producing portion, the non-heating portion being located downstream from the heating portion relative to the direction of movement of the film, the movable support urging the non-heated portion into contact with the film after the heating producing portion has sealed the film; and
   the movable support including perforation means for perforating the film located between the heat producing portions of the sealing strips.

7. The sealing and perforating apparatus of claim 6 wherein the perforation means includes a perforation strip having a longitudinal rib turned toward film.

8. The sealing and perforating device of claim 7 wherein the perforation strip and heat producing portions are heated by the passage of electricity.

9. The sealing and perforating apparatus of claim 6 wherein the non-heating portion of the sealing strips have a width that is greater than a width of the heat producing portion of the sealing strips.

10. An apparatus for sealing and perforating a film comprising:
    a movable support;
    heating means secured to the movable support including two sealing strips spaced from each other, each sealing strip including a heat producing portion for sealing the film by heating a portion of the film, and a non-heating portion having a length which is at least as great as the length of the heat producing portion, the non-heating portion being located downstream from the heating portion relative to the direction of movement of the film, the non-heated portion of the sealing strips being urged against the heated portion of the film after the heat producing portion has sealed the film; and
    the movable support including perforation means located between the heat producing portions of the sealing strips for perforating the film wherein the perforation means are mounted on a base which is movable in a direction parallel to a longitudinal direction of the sealing strips.

11. An apparatus for sealing and perforating a film, comprising:
    a movable support;
    heating means secured to the movable support including two sealing strips spaced from each other, each sealing strip including a heat producing portion for sealing the film; and
    perforation means for perforating the film, the perforation means being mounted on a base which is movable in a direction parallel to a longitudinal direction of the sealing strips, the base being secured to the movable support between the heat producing portions of the sealing strips;
    such that the location of the perforation can be selectively positioned.

* * * * *